Figure 1:
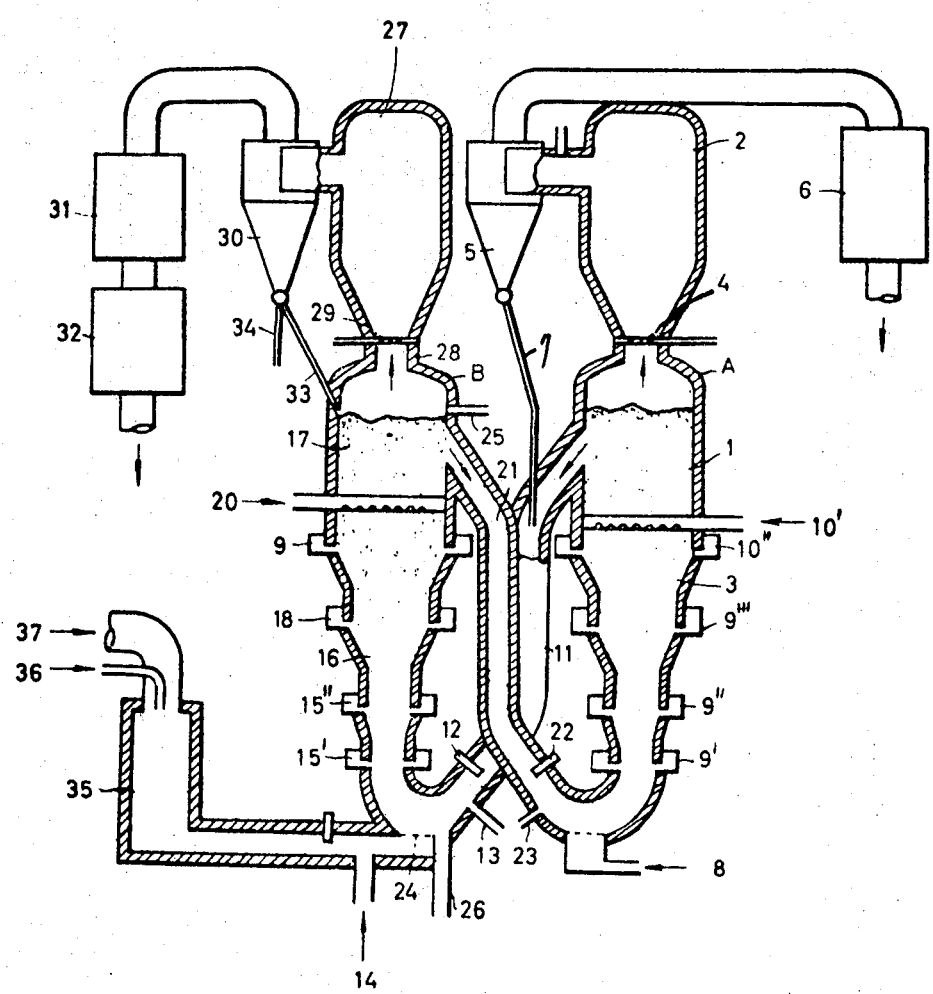

United States Patent [19]

Kunii et al.

[11] 3,708,552

[45] Jan. 2, 1973

[54] PROCESS AND APPARATUS FOR THERMAL CRACKING OF HYDROCARBONS

[75] Inventors: Daizo Kunii, Bunkyo-ku, Tokyo; Taiseki Kunugi, Minato-ku, Tokyo, both of Japan

[73] Assignee: Toyo Soda Manufacturing Co., Ltd., Tokyo, Japan

[22] Filed: Nov. 3, 1970

[21] Appl. No.: 86,574

Related U.S. Application Data

[63] Continuation-in-part of Ser. No. 669,736, Sept. 22, 1967, abandoned.

[30] Foreign Application Priority Data

March 3, 1967 Japan..................................42/13501
Nov. 10, 1966 Japan..................................41/73957
Nov. 10, 1966 Japan..................................41/73958

[52] U.S. Cl...............260/683 R, 23/288 S, 208/53, 208/54, 208/127, 208/163, 208/164
[51] Int. Cl...............................C07c 3/30, B01j 9/18
[58] Field of Search ..260/683; 208/53, 54, 127, 163, 208/164; 23/288 S

[56] References Cited

UNITED STATES PATENTS

| | | | |
|---|---|---|---|
| 2,439,811 | 4/1948 | Jewell | 208/163 |
| 2,871,183 | 1/1959 | Smith et al. | 260/683 |
| 2,731,508 | 1/1956 | Jahnig et al. | 260/683 |
| 2,422,501 | 6/1947 | Roetheli | 260/683 |
| 3,414,504 | 12/1968 | Oldweiler | 208/53 |
| 2,948,670 | 8/1960 | Bray et al. | 208/127 |
| 2,690,990 | 10/1954 | Adams et al. | 208/53 |
| 2,684,931 | 7/1954 | Berg | 208/164 |

Primary Examiner—Delbert E. Gantz
Assistant Examiner—C. E. Spresser
Attorney—Wenderoth, Lind & Ponack

[57] ABSTRACT

Apparatus is provided for thermal cracking of hydrocarbons, which comprises a reaction column A having a reactor attached thereto, and a regenerator B having a combustion and heating chamber attached thereto (see FIG. 1), wherein the reaction column has a large diameter in the upward portion thereof and smaller diameter in the downward portion thereof, the reactor, using a dilute fluidized layer, being connected with the top of the reaction column, and on the other hand the regenerator has a large diameter in the upward portion thereof and a smaller diameter in the downward portion thereof, the combustion and heating chamber, using a dilute fluidized layer, being connected with the top of the regenerator. Means are provided for connecting the upper part of the reaction column to the lowermost portion of the regenerator, and similar means are provided for connecting the upper part of the regenerator to the lowermost portion of the reaction column. A refractory material maintained under concentrated, floatable, fluidized conditions is caused to circulate between the regenerator and reaction column as heat carrier, and to come in contact with hydrocarbons introduced into the reaction column, wherein thermal cracking results in the production of lower hydrocarbons. Means are provided for the thermal isolation of the reactor and reaction column, and similarly for the combustion and heating chamber and the regenerator. Also provided are means for the introduction of raw material hydrocarbons, steam, air and heat carrier into the apparatus.

The apparatus is utilized in the thermal cracking of heavy hydrocarbons, resulting in the production of hydrocarbons of $C_1$, $C_2$, $C_3$ and $C_4$ types, especially ethylene.

5 Claims, 3 Drawing Figures

DAIZO KUNII and
TAISEKI KUNUGI, Inventors

By Wenderoth Lind & Ponack
Attorneys

PROCESS AND APPARATUS FOR THERMAL CRACKING OF HYDROCARBONS

This application is a continuation-in-part of Ser. No. 669,736, filed Sept. 22, 2967, now abandoned.

The present invention relates to a process, and to an apparatus for practicing such process, for obtaining mainly ethylene, which comprises the advantageous production of ethylene by thermal cracking of heavy hydrocarbons, wherein coke grains, sand grains and other refractory grains having a somewhat large average grain size, e.g., about 0.2 to 10 mm and optimally about 0.2 to 5 mm average grain size, are caused to circulate as heat carrier between a reaction column and a regenerator, and hydrocarbons, particularly the heavy oil type of hydrocarbons, introduced into the reaction column, contact the heat carrier maintained under concentrated, floatable, fluidized conditions, whereby the thermal cracking results primarily in the production of ethylene.

Further, more particularly, the present invention relates to a process and appurtenant apparatus for thermally cracking hydrocarbons, which are characterized as hereinafter set forth. Namely, the present invention comprises a reaction column with a reactor attached thereto and a regenerator with a combustion and heating chamber attached thereto, wherein the reaction column has a large diameter in the upward portion thereof, a relatively smaller diameter in the downward portion thereof and then a reactor having an upwardly larger cross section, using a dilute fluidized layer of heat-carrying particles, is connected with the top of the reaction column, and on the other hand the regenerator has a large diameter in the upward portion thereof, a relatively smaller diameter in the downward portion thereof, and a combustion and heating chamber having an upwardly larger cross section, using a dilute fluidized layer of heat-carrying particles, is connected with the top of the regenerator, the upper portion of the reaction column being connected with the bottom of the regenerator by a conduit and the upper portion of the regenerator being connected with the bottom of the reaction column by another conduit. Granular heat carrier heated by combustion in the regenerator is conveyed mainly by self-gravitation into the bottom of the reaction column and the heat carrier is conveyed upwardly in the form of a concentrated fluidized layer by feeding superheated steam and part of the raw material hydrocarbons into the reaction column, a concentrated floatable fluidized layer of heat-carrying particles being formed in the reaction column, the raw material hydrocarbons to be cracked being fed into the reaction column where cracking is effected by the heat of the heat carrier. The reactor is partially isolated from the reaction column by means of a constricted connecting part, and the heat of the thermally cracked gas blown up from the concentrated fluidized layer contained in the reaction zone of the reaction column (i.e., the upper portion of the reaction column) and heat carrying particles floating into the reactor are utilized for the thermal cracking of gaseous hydrocarbons, or distilled oils obtained by distilling crude oil, fed into the connecting portion between the top of the reaction column and the reactor, and the gaseous hydrocarbons or distilled oils are thermally cracked by the heat of the formed dilute fluidized layer of heat-carrying particles in the reactor and, simultaneously, the temperature of the total gas products is quickly reduced by this thermal cracking and the thermally cracked gas is cooled and fixed.

Thus, secondary thermal cracking is controlled and the over cracking of unsaturated hydrocarbons produced in the reaction column is avoided so as to eliminate loss due to secondary reaction and, simultaneously, tar produced is caused to adhere to the heat-carrying particles, resulting in an efficient operation. Then, the cracked products are passed through a cyclone to remove fine heat-carrying particles therefrom, and are then conveyed into a quenching tower for bringing them in contact with hydrocarbons such as light kerosene or gasoline and steam and are then quickly quenched.

Granular heat carrier overflowing from the fluidized conditions in the reaction column is transferred into the bottom of the regenerator mainly by self-gravitation and steam and air are fed into it from below. Then the granular heat carrier in the condition of a concentrated fluidized layer is blown up to the upper part of the regenerator, and air and fuel, if necessary, are fed into the regenerator to maintain the granular heat carrier in the regenerator in a concentrated floatable fluidized condition, and thereby combustion of attached carbon components occurs. Then, the heat carrier, heated and regenerated by the above heat of combustion, overflows, and as above mentioned, such heat carrier is transferred into the bottom of the reaction column mainly by self-gravitation.

Further, a combustion and heating chamber having a larger cross section toward the upper part thereof is provided on top of the regenerator, and the combustion in the combustion and heating chamber containing a dilute fluidized layer of heat-carrying particles is accelerated by air blown in and up from the exterior surrounding the connection between the regenerator and combustion and heating chamber, and the combustion and heating chamber is maintained at a higher temperature than the temperature in the regenerator.

Thus, combustible gas blown up into the combustion and heating chamber and fine powdery coke attached to the heat-carrying particles of the dilute fluidized layer, which are also blown up into the combustion and heating chamber from the regenerator, are efficiently burned, and the combustion and heating chamber is thus effectively heated. Then, by dropping the heat carrier into the regenerator, the heat generated in the combustion and heating chamber is recovered in the regenerator.

The present invention relates to the serial equipment, for thermal cracking of hydrocarbons, of the fluidized layer of coarse grain circulation type as above-mentioned.

The principal object of the present invention is to provide a process and corresponding apparatus for the advantageous thermal cracking of hydrocarbons, in which the intended thermally cracked gas is produced from hydrocarbon oil in high yield and good thermal efficiency by using coarse granular media. Moreover, the operation can be easily regulated and the reaction column and regenerator can be designed at a low height, so that relatively small scale equipment can be used. Besides the above, tar attachment in the interior of the equipment can be prevented as much as possible and abrasion inside the equipment can be lessened, these and other numerous advantages flowing from the present process.

A "concentrated fluidized layer" in the above-mentioned process means a heat carrier porosity of 0.55 up to 0.85 and a "dilute fluidized layer" means a heat carrier porosity of 0.85 or more.

In practicing the present invention, the temperature for the reaction column is preferably selected in the range of 700°C to 900°C and the temperature at the outlet of the reactor is preferably in the range of 500°C to 700°C.

In other words, the temperature inside the reactor is preferably specified in the range of 500°C to 700°C in order to control secondary thermal cracking of the thermally cracked gas produced in the reaction column.

Surplus heat in the reactor is utilized for thermal cracking of gaseous hydrocarbon or distilled oil produced by distilling crude oil provided for the cooling use in the connected portion between the reaction column and the reactor, the amount of hydrocarbons fed for this cooling use advantageously being in the range of 5 to 30 percent by weight in proportion to the amount of hydrocarbon oil fed into the reaction column. As above-mentioned, the cooling inside the reactor has the effect of cooling and fixing the thermally cracked gas produced in the reaction column and additionally another effect of maintaining adhesion between the produced tar and heat carrier particles.

Further, the temperature of the regenerator is preferably maintained in the range of about 900°C to 1,050°C and the temperature in the combustion and heating chamber containing the dilute fluidized layer is desirably kept at 150°C higher than the above specified range in the regenerator.

A combustible gas such as carbon monoxide blown into the combustion and heating chamber containing the dilute fluidized layer and fine powdery coke attached thereto are burned by the air blown into the connected portion between the combustion and heating chamber and the regenerator. A portion of heat generated above is employed for heating the heat carrier, and the heated heat carrier is dropped into the regenerator, whereby one part of surplus heat generated in the combustion and heating chamber containing the dilute fluidized layer is recovered in the regenerator.

Further, a waste heat boiler is fitted to the combustion and heating chamber in the upper part thereof and, thus, its temperature can be regulated as specified, and simultaneously the surplus heat can be recovered, these being factors which are ad-vantageous in practicing the process of the present invention.

The methods of carrying out the present invention are described with reference to the attendant drawings in which:

FIG. 1 shows one example of a vertical section view of the apparatus, established according to the present invention.

Figure 2A:
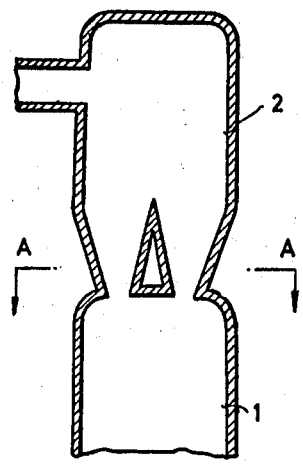
Figure 2B:
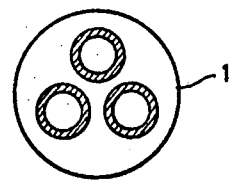

(a) and (b) in FIG. 2 are, respectively, a vertical sectional view of the connecting part between the reactor and the reaction column, and a cross sectional view at line A—A.

However, the drawings are intended to be solely illustrative of the apparatus of the present invention and are not meant to limit the invention.

In the drawings, in FIG. 1, A is a reaction column and B is a regenerator. Reaction column A has a reaction zone 1 of relatively large diameter in the upward part of the reaction column, and a reactor 2 is connected with the top of the reaction column A, the reactor having a relatively large cross section toward the upward part thereof and a narrower cross section toward the bottom. Inside the reaction column A, coarse granular heat carrier material forms a concentrated floatable fluidized layer.

In the lower part 3 of reaction column A, the coarse granular heat carrier of high temperature from the regenerator B is conveyed, in the state of concentrated fluidized layer, into the upper part of the reaction column A.

While the primary thermal cracking is carried out in the reaction column A, gaseous hydrocarbons or distilled oils obtained by distilling crude oils are fed through conduit 4 in the constricted connecting part at the top of reaction column A into reactor 2, and the gaseous hydrocarbons or distilled oils are thermally cracked in the reactor 2 by utilizing the high temperature heat of the thermally cracked gas blown up from the reaction column A and also of the heat carrier particles floating into the reactor 2. In this way, the primary thermally cracked gas blown up into the reactor 2 is prevented from undergoing a secondary thermal cracking.

While FIG. 1 shows a single constricted passageway between the reaction column A and the reactor 2, the connecting part between reaction column A and reactor 2 may be in the form of two or three, preferably three, conduits, whereby the cooling velocity for the thermally cracked gas fed from the reaction column A into the reactor 2 is accelerated so that the reactor can be advantageously designed at a low height.

The thermally cracked products discharged from the reactor 2 pass through a cyclone separator 5 and a cooling and washing apparatus 6 and are then transferred into the next apparatus for treatment. Pulverized granules settled in the cyclone 5 pass through a pipe 7 and return into conduit 11.

The granular heat carrier at high temperature in the condition of a concentrated fluidized layer is conveyed upwardly from the lower part 3 in the reaction column A, by the action of steam introduced at several steam inlet pipes 8, 9', 9'' and 9''' fitted on the bottom and lateral wall of lower part 3 of the reaction column.

Raw material hydrocarbon, if necessary, may be fed into the lower part 3 from all or one of inlet pipes 9', 9'' and 9''' on the lateral wall.

Further, hydrocarbon inlet pipes proper, such as supply memebers 10' and 10'' are fitted in the lower portion of the reaction zone 1, the feeding method being optionally selected, e.g., a mixed gas of raw material and steam may be blown downwardly and laterally into zone 1 e.g., through inlet pipes 10' and 10''.

A flow regulating valve 12 and a steam inlet pipe 13 for regulating gaseous flow are fitted on the passage 11, which is employed for conveying, by self-gravitation, the granular heat carrier overflowing from the upper part of the fluidized layer in reaction column A into the bottom of regenerator B. Further, the passage 11 need not necessarily be of the configuration shown.

The granular heat carrier conveyed into the lowermost part of regenerator B is moved up through the lower part 16 of the regenerator, maintaining the condition of concentrated fluidized layer by means of steam introduced from feed pipes 14, 15' and 15'' and the said carrier is conveyed into the upper part 17 of the regenerator having a relatively enlarged diameter.

In the upper part 17 of the regenerator, in operation, the granular heat carrier is retained in the condition of a concentrated floatable fluidized layer. In the lower vertical extension of upper part 17, pipes 18 and 19 for feeding heated air are mounted, and if necessary a feed pipe for gaseous or liquid fuel 20 is also fitted thereon.

The particular dispositions of the several pipes may be appropriately changed, if desired.

In the upper part 17 of the regenerator, carbon particles attached to the granular heat carrier, and other fuels, are burned, and the granular heat carrier at high temperature overflows from the floatable fluidized layer and drops by self-gravitation through the passage 21 and is conveyed to the bottom of reaction column A. Along the passage 21, there are fitted a flow regulating valve 22 and a steam feed pipe 23 for regulating gaseous flow. This passage 21 need not necessarily be a straight line.

Thus, heat carrier of coarse grain is forced to circulate between the reaction column A and the regenerator B. A feed pipe 25 of coarse grain heat carrier is fitted at the upward part of regenerator B and a discharge pipe 26 is fitted at the lower part of the regenerator B.

Furthermore, a combustion and heating chamber 27 containing a dilute fluidized layer of heat-carrying particles and having a larger cross section toward the upward part thereof is connected with the top of the regenerator B.

By feeding air through a supply pipe 29 from the exterior of the connecting part 28, combustible gas and pulverized coke powder from the lower part are burned and, further, by heating the heat carrier in the combustion and heating chamber and dropping it into the regenerator, the heat of the dilute fluidized layer in the combustion and heating chamber is recovered. In this case, the connected part is desirably constricted as shown at 28 and, thereby, the combustion of pulverized coke powder and combustible gas can be accelerated by the feeding of air. This, after combustible gas, such Thus, hydrogen, carbon monoxide and methane have been completely burned, the resultant gases pass through cyclone 30, waste heat boiler 31 and air preheater 32, and are discharged.

The part of the heat carrier separated in the cyclone 30 passes through the pipe 33 and returns to the fluidized layer in regenerator B, whereas the remainder passes through the pipe 34 and is discharged out of the system.

A combustion chamber 35 connected with the lower end of regenerator B is employed mainly for starting use.

For the starting operation, gaseous or liquid fuel is blown from supply inlet 36 and air is blown in from inlet 37. The high temperature gas obtained by this combustion is introduced into the bottom of regenerator B through the grate 24 and thereby the granular heat carrier is heated.

As above-mentioned, the present invention relates to a process and apparatus therefor, for the thermal cracking of hydrocarbons, in which a granular heat carrier is burned under the conditions of a concentrated floatable fluidized layer in the upper part 17 of the regenerator and is heated to high temperature, and the granular heat carrier then descends mainly by self-gravitation through the passage 21 into the bottom of reaction column A and the heat carrier in the form of concentrated fluidized layer is transported upward by steam into the upper part 1 of the reaction column.

Further, raw material hydrocarbons are fed from the pipes 9', 9''' and 10' and 10'' in the reaction column and the hydrocarbons, in contact with the granular heat carrier in the concentrated floatable condition, are thermally cracked in the upper part 1 of the reaction column.

The high temperature gas generated by this thermal cracking acts, in turn to thermally crack the gaseous hydrocarbons or distilled oils, obtained by distilling crude oils, which are supplied through the supply conduit 4 into the reactor 2, and simultaneously the temperature of the generated gas itself is reduced.

Configurations of reaction column A and regenerator B need not necessarily be those shown in the drawings. Any shape of reaction column and regenerator which has a comparatively smaller diameter toward the downward part thereof and an appropriately larger diameter toward the upward part to enable the formation of the concentrated floatable fluidized layer can be acceptably utilized.

Furthermore, pipes or plates can be installed inside the members A and B to help effect homogeneous floating movement. Further, the connection between the reactor 2 and the reaction column A need not necessarily be a single opening. A connection involving two or more openings is also acceptable.

Further, the connecting part between the combustion and heating chamber 27 and the regenerator need not necessarily be as shown in the drawing.

The present invention relates to a process and appurtenant apparatus for thermally cracking hydrocarbons in compliance with the above illustrated method in which the thermal cracking and the regeneration of granular heat carrier are carried out in separate towers, so that the equipment can be easily regulated, and carbon produced secondarily can be completely utilized, providing good thermal efficiency, and wherein the thermally cracked gas contains a minor amount of carbon dioxide and carbon monoxide gases, enabling purification to be carried out easily and, furthermore, wherein coarse, larger grains (compared with the known thermal cracking process or the known process utilizing a fluidized layer) can be employed. Consequently, the quantity of raw material treated is large in proportion to the volume of the equipment, and the granular particles having a large flow velocity are substantially free from the possibility of colliding with the wall surfaces so that the abrasions of granular particles and equipment can be kept at a minimum.

Furthermore, circulation of granular particles is carried out in a sequence of floatable fluidized layer— downward moving solids by self-gravitation—floatable fluidized layer, and the reaction can be carried out by moving the granular particles upwardly in the reaction column, so that the complete equipment system can be constructed at a low height compared with the size of the apparatus utilized in the prior known processes.

Following are exemplary embodiments of thermal cracking of crude oil according to the present invention.

EXAMPLE I

An apparatus as illustrated in FIG. 1 was employed, the reactor and reaction column (combined), and regenerator and combustion and heating chamber (combined) each being 1,575 mm in total height, the reactor having a maximum inside diameter of 105.3 mm and a height of 350 mm. The reaction column had an inside diameter of 105.3 mm in its upper portion and an inside diameter of 35.7 mm in its lower portion, with a reverse conic shape constricted downwardly, the portion connecting the reactor and the reaction column having an inside diameter of 35.7 mm. As heat carrier, coke powder of 0.2 mm to 0.4 mm in grain size was used and as a raw material hydrocarbon oil, Duri crude oil (Conradson carbon content: 8.3 percent) was fed at 900 grams/hour, and as a quenching hydrocarbon, naphtha was fed at 100 grams/hour. The thermal cracking was carried out at 810°C and the regeneration was practiced at 860°C.

| | |
|---|---|
| Circulation speed of heat carrier | 30 kilograms/hour |
| Porosity of reaction zone | 0.73 |
| Contact time | 0.4 sec. |
| Gasification rate in proportion to total weight of hydrocarbon: | 63.7% |
| Gas yields in proportion to total weight of hydrocarbon: | |
| $H_2$ | 1.5% |
| $CO_2$ | 4.4% |
| CO | 2.9% |
| $CH_4$ | 16.0% |
| $C_2H_6$ | 2.3% |
| $C_2H_4$ | 27.4% |
| $C_3H_8$ | 0.1% |
| $C_3H_6$ | 7.7% |
| $C_4$ hydrocarbons (containing $C_4H_6$, $C_4H_8$ and $C_4H_{10}$ as main components) | 1.2% |
| $C_2H_2$ | 0.2% |

EXAMPLES II TO V

Equipment similar to that of Example I was employed, with various factors being changed, and the results were obtained as listed below:

| Example | II | III | IV | V |
|---|---|---|---|---|
| Crude Oil | Seria | Minas | Kuwait | Khafji |
| Content of Conradson carbon in crude oil (per cent by weight) | 0.19 | 2.8 | 5.9 | 6.8 |
| Flow rate of crude oil (kg/hr) | 1.19 | 0.986 | 1.09 | 1.01 |
| Hydrocarbon for the quenching use | Light Naphtha | Heavy Naphtha | Kerosene | Propane |
| Range of boiling point for said hydrocarbon (°C) | 40 to 110 | 100 to 180 | 180 to 260 | - |
| Flow rate of said hydrocarbon (kg/hr) | 0.05 | 0.11 | 0.18 | 0.20 |
| Flow rate of steam in reaction zone (kg/hr) | 0.82 | 1.34 | 1.26 | 1.05 |
| Heat carrier | Sand | refractory material | Coke | Carbon grain |
| Grain size of heat carrier (mm) | 0.2 to 0.4 | 0.2 to 0.5 | 0.3 to 0.8 | 0.35 to 0.84 |
| Porosity of reaction zone | 0.73 | 0.76 | 0.75 | 0.79 |
| Temperature in upper reaction column (°C) | 720 | 760 | 805 | 850 |
| Temperature in upper regenerator (°C) | 805 | 820 | 837 | 890 |
| Flow rate of grain circulation (kg/hr) | 26.7 | 23.8 | 31.6 | 21.6 |
| Gasification rate in proportion to total weight of hydrocarbon (per cent) | 60.9 | 67.6 | 68.9 | 70.3 |
| Gas yields in proportion to total weight of hydrocarbon (per cent) | | | | |
| $H_2$ | 0.6 | 1.0 | 1.0 | 1.5 |
| CO | 0.1 | 0.4 | 1.2 | 3.2 |
| $CO_2$ | 0.1 | 0.4 | 1.4 | 4.3 |
| $CH_4$ | 8.0 | 10.4 | 13.8 | 16.0 |
| $C_2H_2$ | | | 0.3 | 1.1 |
| $C_2H_4$ | 19.0 | 26.0 | 27.8 | 28.0 |
| $C_2H_6$ | 2.8 | 2.0 | 2.2 | 1.8 |
| $C_3H_6$ | 16.8 | 13.5 | 9.0 | 5.8 |
| $C_3H_8$ | 1.0 | 0.8 | 0.7 | 0.7 |
| $C_4H_6$ | 4.0 | 4.7 | 7.3 | 4.7 |
| $C_4H_8$, $C_4H_{10}$ | 8.5 | 8.4 | 4.2 | 3.2 |
| Contact time (sec) | 0.85 | 0.62 | 0.50 | 0.40 |

Having thus disclosed the invention, what is claimed is:

1. An apparatus for producing olefins by the thermal cracking of hydrocarbons which comprises a reaction column for forming a fluidized state of granular heat carrier, having a reactor attached to the top thereof, and a regenerator for burning carbon particles adhering to the granular heat carrier thereby heating the heat carrier to maintain the heat carrier in a fluidized state, by means of supplying air and optionally fuel to the regenerator, having a combustion and heating chamber attached to the top thereof, the reaction column having a downward portion thereof of smaller diameter than the diameter of the upward portion thereof for conveying the granular heat carrier upward in a fluidized layer state by means of supplying superheated steam and a portion of the raw material hydrocarbon to the reaction column, the reactor being connected to the top of the reaction column by means of a constricted connecting part, the reactor utilizing the heat of thermally cracked product gas having a high temperature by submitting gaseous hydrocarbons or distilled oils obtained from crude oil fed into the connecting portion between the reaction column and the reactor to thermal cracking by a dilute fluidized layer and simultaneously therewith the temperature of the total gas products is quickly reduced by the thermal cracking so that the thermally cracked product gas is fixed and tar produced adheres to the granular heat carrier, the regenerator having a downward portion of smaller diameter than the upward portion thereof for conveying the granular heat carrier upwardly in a fluidized state by means of blowing steam and air from the lower portion of the regenerator, the combustion and heating chamber being connected to the top of the regenerator by means of a constricted connecting part, the combustion and heating chamber being utilized for burning combustible gas and powdery coke attached to the granular heat carrier and simultaneously heating the granular heat carrier by means of blowing air into the constricted connection, the upper portion of the reaction column being connected to the bottom of the regenerator for transferring the granular heat carrier overflowing from the fluidized conditions in the reaction column into the bottom of the regenerator substantially by self-gravitation, and the upper portion of the regenerator being connected to the bottom of the reaction column for conveying the granular heat carrier regenerated by heat of combustion in the regenerator into the bottom of the reaction column substantially by self-gravitation, the constricted connecting part between the reaction column and the reactor containing at least one conduit, and being such that the diameter at the constricted connecting part is less than the diameter of the upper portion of the reaction column, the constricted connecting part between the upper portion of the regenerator and the combustion and heating chamber containing at least one conduit, and being such that the diameter at said latter constricted connecting part is less than the diameter of the upper portion of the regenerator, the reaction column being fitted with pipes for feeding raw material hydrocarbons and pipes for feeding steam, the regenerator being fitted with pipes for feeding air and fuel and pipes for feeding steam respectively, the constricted connecting part between the reaction column and the reactor being fitted with pipes for supplying gaseous hydrocarbons or distilled oils obtained from crude oil, and the constricted connecting part between the regenerator and the combustion and heating chamber being fitted with pipes for feeding air.

2. A method for producing olefins by the thermal cracking of hydrocarbons, comprising transferring a granular heat carrier, at high temperature, from a regenerator into a juxtaposed reaction column, maintaining the granular heat carrier, in the reaction column, in a concentrated floatable fluidized layer state by feeding superheated steam thereinto, feeding the raw material hydrocarbon to be thermally cracked into the upper part of the fluidized layer in the reaction column, feeding gaseous hydrocarbons or distilled oils into a reactor through a connecting part between the reactor and the top of the reaction column, to be thermally cracked under dilute fluidized layer conditions by means of the high temperature of the thermally cracked gas blown up into the reactor from the fluidized layer in the reaction column and the heat carried by the fine heat carrier accompanying the gas, thus simultaneously cooling all of the thermally cracked gas and recovering it with high efficiency by preventing the secondary reaction of unsaturated hydrocarbon produced in the fluidized layer in the reaction column, transferring the granular heat carrier from the reaction column into the regenerator, maintaining the granular heat carrier, in the regenerator, in a concentrated fluidized layer state, feeding air or fuel into the regenerator, burning the granular heat carrier in the upper part of the regenerator under concentrated floatable fluidized layer conditions, feeding air into a combustion and heating chamber through a connecting part between the combustion and heating chamber and the top of the regenerator, to burn combustible gas and fine powdery coke attached to the heat-carrying particles blown up into the combustion and heating chamber under dilute fluidized layer conditions from the regenerator, dropping the coarse coke grains produced in the combustion and heating chamber into the regenerator to thereby recover the heat generated in the combustion and heating chamber, and transferring the granular heat carrier regenerated and heated by said combustion into the reaction column.

3. A method according to claim 2, wherein the heat carrier is selected from the group consisting of coke, sand and refractory particles having an average grain size of from 0.2 to 10 mm.

4. A method according to claim 2, wherein the heat carrier is coke having a grain size of from 0.2 to 5 mm.

5. A method according to claim 2, wherein the temperature in the reaction column is maintained within a range of about 700°C to about 900°C, the temperature in the reactor is maintained within a range of about 500°C to about 700°C, the temperature in the regenerator is maintained within a range of about 900°C to about 1,050°C, and the temperature in the combustion and heating chamber is maintained within a range of about 1,050°C to about 1,200°C.

* * * * *